Figure 1:
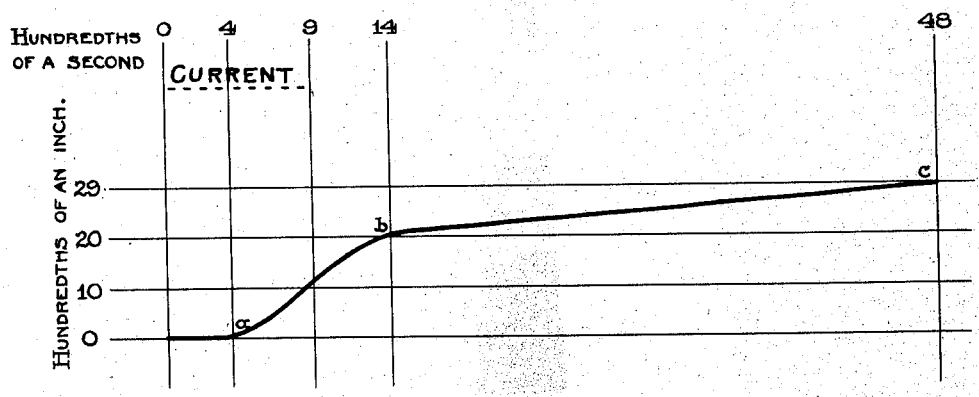

Nov. 17, 1931.  T. E. MURRAY, JR., ET AL  1,832,497

MAKING ELECTRIC RESISTANCE WELDS

Filed Oct. 4, 1921

Thomas E. Murray, Jr.
George H. Phelps
INVENTORS

BY
D. Anthony Usina
ATTORNEY

Patented Nov. 17, 1931

1,832,497

UNITED STATES PATENT OFFICE

THOMAS E. MURRAY, JR., OF BROOKLYN, NEW YORK, AND GEORGE H. PHELPS, OF WAREHOUSE POINT, CONNECTICUT; SAID PHELPS ASSIGNOR TO SAID MURRAY

MAKING ELECTRIC RESISTANCE WELDS

Application filed October 4, 1921. Serial No. 505,294.

In a prior patent of Thomas E. Murray, Jr., No. 1,281,636, dated October 15, 1918, (reissued October 10, 1923, No. 15,466) there is described a method of welding metal parts together which consists in bringing them into contact and passing through the joint a current of extremely high amperage for a very short period of time.

Our present invention is directed to certain steps in the regulation and application of this class of welding processes by which improved results can be had.

We find, for example, that for the best results there should be during the operation a continuous pressure exerted on the parts and regulated within certain limits and according to certain factors, particularly according to the current density, time, extent of take-up, and composition of the metal; the invention being directed particularly, but not exclusively, to steel (or iron). We have found that the time of cutting off the current plays an important part in securing a good weld.

When high current densities are used, it is important to use high pressures to force the parts together as fast as it is heated to the proper temperature. Otherwise the metal will burn out or at least be badly oxidized at the weld.

Similarly when high pressures are used it is important to use high current densities. Otherwise the metal at the joint will be upset and forced outward faster than it becomes heated, or before it becomes heated to the proper temperature,—the result being a joint which is so weak as hardly to be called a weld. And in extreme cases the parts would not even be stuck together.

It follows that the converse is true. When low current densities are used it is important to use low pressure, and when low pressures are used it is important to use low current densities.

In summary, the pressure used should be in a balanced relation with the current density in order that the metal may heat to the welding temperature as fast as it is squeezed out at the edge by the pressure, and that it may be squeezed out progressively at the edge as fast as it is heated to the welding temperature.

Practice has shown, other elements of the problem being fixed, that such a balanced relation is obtained when a pressure of about 8000 pounds per square inch (say within a range from 4000 to 14,000 pounds) is used with a current density of about 100,000 amperes per square inch. Practice has also shown within the limits of our apparatus, that if either the pressure or the current density be changed from the above value, the other must be changed in the same ratio; that is, about 8000 pounds pressure per square inch must be applied for every 100,000 amperes per square inch. The above relation has been checked from 8000 to 22,000 pounds per square inch and from 100,000 to nearly 300,000 amperes per square inch; and apparently it would remain true over a still wider range.

We have found that for a given time interval there is a certain range of pressures above and below which a good weld is not obtained. The reasons for this range are probably as follows:—

As low carbon steel is heated it becomes first plastic and then after a considerable rise in temperature, fully melted. In the intermediate, plastic, condition it can be welded, and the metal must be forced together while in this plastic stage in order to get good results. If the pressure used is too heavy the metal will be squeezed up while still too cool to weld properly. If the pressure is too light the metal will not take up until it has been overheated or even actually melted. If the pressure used is between these two limits the resulting weld will be good. It will be understood that the pressure is applied before the current and is continued throughout the entire operation. It would be impracticable to apply the pressure after the current is commenced in this class of quick welding operations.

When high carbon steel is heated it also passes through a plastic stage, but the range of temperatures during which it is plastic is narrower than in the case of low carbon steel. Drill rod steel, for example, melts at a temperature only slightly above that at which it becomes plastic. And experience has shown that the range of pressures which give good welding results is also narrower. Again, high carbon steel burns more readily than low carbon steel. Experience has shown that it should be welded with a higher pressure than that used for low carbon steel. This higher pressure squeezes out the metal before it reaches the excessive temperature.

In welding brass, zinc and other metals which melt practically without becoming plastic, the range of pressures at which good welds can be made is very narrow.

It is, then, because steel or iron passes through a plastic stage, of gradually increased plasticity as the input of heating current is continued, that it is possible to get good welds in it over a fairly wide range of pressures.

This discussion of the range of pressures is based on the assumption that the current density and time are kept constant. If the current and time are changed, good welds can be made with pressures far outside of the range determined for another current density and time.

It is, therefore, possible to weld steel satisfactorily over a considerable, but limited, range of pressures if the rate of putting heat into the metal is kept constant. It is possible to weld the same steel satisfactorily over a wider range of pressures if the rate of introduction of heat is varied, even if the actual total amount of heat introduced is kept constant; that is, if the time be cut down correspondingly when the current density is increased.

This process is to be distinguished from ordinary welding operations in which the parts are brought to a welding heat comparatively slowly and are held at such heat for a considerable length of time, so that the exact degree of mechanical pressure with which they are forced against each other is not important. In order to increase the current density used the time interval during which the current is on is to be diminished; and vice versa; therefore, if we wish to use a higher pressure we must not only increase the current density but must also shorten the time interval.

We have made welds with a time interval of less than .037 of a second but prefer to keep the time limit over 1/10 of a second for convenience of control. With such a brief time interval we have satisfactorily welded both low carbon steel and high carbon steel with pressures as high as 22,000 pounds per square inch. If the electric control were designed to permit the application of the current for still shorter lengths of time, good welds could be secured with still higher pressure.

The following is a table of certain experiments in which we have succeeded in securing very good welds for low carbon quarter-inch steel rods and which indicate an approximate rule that the time interval should be changed inversely as the square of the current density and that the pressure should be changed directly as the current density. The data are not individual readings on four single welds, but rather a demonstration or exemplification of the rule stated. A number of welds were made with the machine set to deliver 100,000 amperes per square inch for a third of a second. These welds were made with various pressures and the best results were obtained with a pressure close to 8,000 pounds per square inch. Other similar tests were made for the different currents and times shown in the table, and the best results for each were obtained at close to the pressures stated in the third column.

| Current (amp. per sq. inch) | Time (seconds) | Pressure (lbs. per sq. inch) |
|---|---|---|
| 100,000 | .333 (1/3) | 8,000 |
| 125,000 | .213 $\frac{1}{(4.9)}$ | 10,000 |
| 175,000 | .109 $\frac{1}{(9.2)}$ | 14,000 |
| 300,000 | .037 $\frac{1}{(27)}$ | 24,000 |

Substantially the same results were obtained for high carbon steel. And substantially the same ratios of time and pressure to current density will give good welds for other metals and alloys.

We prefer to design the transformer or other source of current so as to pass at least 90,000 amperes per square inch through the metal to be welded. With a lower amperage it is difficult to secure the quickness of operation which is so important a feature of the process.

As to the time interval, we prefer to keep the time limit under one second, at least for comparatively small areas, so as to avoid oxidation of the metal and transmission of heat away from the point of the weld; though for larger areas a time interval of a few seconds may be used.

In referring to time intervals we mean the interval of time between the switching of the current on and off. And the pressures referred to are static pressures applied initially to the parts.

Figure 2:
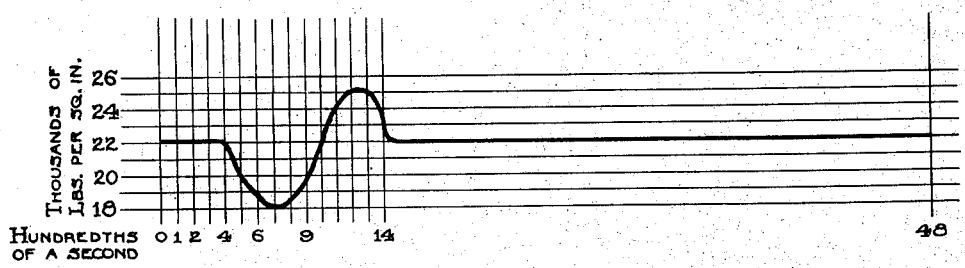

The accompanying drawings, in Figures 1 and 2, contain diagrams showing the time intervals and progress of the take-up and the computed pressures at different points in the take-up.

Referring first to Fig. 1, the take-up curve, there is a short time interval of four hundredths of a second during which there is no take-up, apparently because the metal is not sufficiently softened.

In the interval from the fourth to the ninth hundredth of a second the take-up proceeds rapidly. At the end of this interval the current is cut off.

In the next interval, from the ninth to the fourteenth hundredth of a second, the take-up continues at approximately the same rapid rate, gradually diminishing toward the end of this interval.

This stage is followed by a fairly abrupt change, due to the hardening of the metal, and the take-up continues at a practically uniform and comparatively slow rate to the end. At forty-eight hundredths of a second the take-up is complete. A small part of the take-up in this last stage is due to contraction of the metal by cooling, the pressure serving to hold the parts in shape during such contraction.

The major part of the take-up in this last stage is due to the fact that the cooling metal has not regained sufficient strength to withstand the heavy pressure applied; so that the take-up continues at a diminishing rate until the pressure is no longer heavy enough to take-up the cooling metal.

Practically all the take-up after the welding current is cut off (from nine to forty-eight hundredths on the diagram) constitutes mechanical working of the heated metal in and near the weld and improves the properties of that metal by refining its grain and preventing excessive grain growth. It is analogous to hydraulic hot forging, a process well known to refine the grain of metal throughout its mass. This working is undoubtedly beneficial and is not obtained in fast electric welds unless the current is cut off considerably before the take-up is completed; say at approximately one-half the take-up or less, as in the case illustrated.

The relation of the current to the time intervals and to the take up is indicated by the broken line. The time of switching on the current corresponds to the beginning of this line and the beginning of the operation. The end of this line indicates the cutting off of the current at the ninth hundredth of a second. The separate parts of the line correspond to successive half-cycles in the current.

An example of the pressure curve is shown in Fig. 2. The static pressure is 22,000 pounds per square inch, but the pressure during the operation is varied by the speed of the take-up. As computed it shows, first a constant pressure until the take-up commences, then a diminution of the pressure from 22,000 to 18,000 pounds as the metal yields, followed by a rise to 22,000 and a further rise to about 25,000 pounds as the metal gradually hardens, followed by a drop to the normal 22,000 which continues during the last stage.

The observation and regulation of the process in the manner above described can be accomplished, for example, by means of an indicator for which a patent application is pending in the name of George H. Phelps No. 505,140, filed October 3, 1921.

In carrying out the process of the invention it will be understood that electric resistance welding is used almost entirely in the production of large numbers of identical pieces. This being the case, we need not attempt to set each adjustment on the welder so as to obtain on the first weld, conditions exactly corresponding to the values recommended in the present application. It is much quicker and more efficient to adjust the machine approximately for the first weld, to measure the values of current, time and pressure as actually obtained and then correct them to those values called for in the table in making the first few welds. Thus very few pieces, if any, are spoiled and the ideal settings are arrived at very quickly and with a minimum of cut and try.

Assume that a person skilled in the art is confronted with the task of welding pieces of steel of one square inch cross sectional area. First, being skilled in the art, he must choose a suitable projection for the work beyond the electrodes. In making this choice he will be influenced by the thickness of the section to be welded and by its shape. The material to be welded, its cross sectional area, and the distance between electrodes then determine the electrical resistance offered the welding current in passing from one electrode to the other through the work.

He then observes that to weld one square inch of steel according to the present method he must have a total current of between 100,000 and 300,000 amperes. He further observes that the higher value will undoubtedly be more difficult to handle uniformly inasmuch as switching mechanism operating with the extreme rapidity demanded by this current density will surely be subject to a greater proportional variation than those operating at a more moderate timing. He therefore prefers a current of about 125,000 amperes.

Since the resistance of the work and the current are known, he is able to provide himself with a suitable current supply to his electrodes, either by a choice of taps on the available transformer in his welder or by replacing this transformer with one which is suitable if necessary.

Now he must provide a pressure of 10,000 pounds on the work. This may be done by any of the well known means, of which two examples are solenoids and air cylinders.

The time of application of the welding current remains to be controlled and this may be done in many ways, of which two are as follows:

The first of these means is a wattmeter relay control. This control cuts off the welding current after a predetermined amount of energy has passed. Since the conditions of resistance of work, current, voltage and so on are for all practical purposes exactly duplicated each time a weld is made, it is obvious that this control will cut off the welding current after a certain uniform length of time. This length of time is readily adjustable by the relay setting. Such wattmeter relay control is fully described in the patent to H. R. Woodrow No. 1,230,357—June 19, 1917, on "device for controlling energy delivered to welding electrodes".

This type of relay control is also incorporated in the patent to Thomas E. Murray, Jr. and J. B. Murray No. 1,320,896, November 4, 1919 on "method of controlling electric welding machines". The relays themselves are made and sold by the Westinghouse Electric & Manufacturing Company and are called by them "time element overload relays".

The second means of controlling the time is dependent on the fact that in making a number of duplicate welds under a pressure fixed in amount, and with a uniform current density, the softening of the metal takes place at a uniform rate. Since this is the case and since the pressure on the softening metal is the same in each case, the travel of the movable electrode will be uniform. Now if a simple tripping device be arranged in such a way that the welding current is cut off after a pre-determined amount of electrode motion or take-up has occurred, the desired result has been obtained, for in a number of welds, the cut-off will take place after a uniform time.

Now that we have means of controlling current, pressure and time, it only remains to determine what the values of these variables are. A weld is made with the settings of the machine as nearly according to the values in the table as can be predicted in advance. The making of this weld is recorded on a Phelps indicator (application No. 505,140 referred to above) or on one of the type illustrated in Merriam Patent No. 881,479 March 10, 1908 and from this record the actual time of application of the welding current is determined. If the time does not agree with that called for in the table the time controlling device is adjusted until it does agree. This measurement of the time for adjusting the setting may also be accomplished by means of a cycle counter—a commercial instrument.

The machine is now set to weld very closely to the conditions called for in the table. If, however, it is desired to obtain these conditions more exactly the procedure should be as follows:

An oscillograph is used to measure the actual current passing through the work during welding. If this value is not exactly that calculated upon, the pressure is adjusted to that value corresponding with the measured current, and the time re-adjusted to its new proper value.

The measurement of the pressure has previously been passed over as being too simple to require discussion. A piston operating against oil in a cylinder, the pressure of the oil being measured on a gauge, is perhaps the simplest of these methods. This is the exact reverse of the process commonly used in calibrating pressure gauges.

As to the adjustment of the pressure on the weld; a slight change in air pressure in the air cylinder, a slight change in the current through the winding of the solenoid, a slight further compression or expansion of the spring; each of these will easily adjust the pressure available on the work as derived from its particular source.

Though we have described with great particularity of detail certain processes embodying our invention, yet it is not to be understood therefrom that the invention is restricted to the particular steps or to all the steps described. Various modifications may be made by those skilled in the art without departure from the invention as defined in the following claims.

What we claim is:

1. In electric welding by passing a current of extremely high amperage for a very short period of time, the method which consists in pressing the parts together through a determined take-up and cutting off the current at approximately one-half the take-up.

2. In the electric welding of steels by passing a current of extremely high amperage for a very short period of time the method which consists in pressing the parts together through a determined take-up and cutting off the current at approximately one-half the take-up.

3. In the electric welding of steels by passing a current of extremely high amperage for a very short period of time the method which consists in pressing the parts together through a determined take-up, applying thereto for a short interval of time a welding current of approximately 100,000 amperes per square inch for each 8,000 pounds per square inch pressure applied and cutting off the current at approximately one-half the take-up.

4. In the electric welding of steels to form a unitary body of predetermined desired size the method which comprises pressing the parts together with a predetermined high pressure through a predetermined take-up distance, applying thereto for a short interval of time a welding current of approximately 100,000 amperes per square inch for each 8,000 pounds per square inch pressure applied and cutting off the current at approximately one-half the take-up distance.

In witness whereof, we have hereunto signed our names.

THOMAS E. MURRAY, Jr.
GEORGE H. PHELPS.

CERTIFICATE OF CORRECTION.

Patent No. 1,832,497.

Granted November 17, 1931, to

THOMAS E. MURRAY, JR., ET AL.

It is hereby certified that the above numbered patent was erroneously issued to "Thomas E. Murray, Jr.", as assignee of the entire interest in said invention, whereas said patent should have been issued to Metropolitan Engineering Company, a corporation of New York, as assignee by direct and mesne assignments of the entire interest in said invention, as shown by the records of assignments in this office; and that the said Letters Patent should be read with this correction therein that the same may conform to the record of the case in the Patent Office.

Signed and sealed this 2nd day of February, A. D. 1932.

(Seal)

M. J. Moore,
Acting Commissioner of Patents.